(12) United States Patent  
Troutt

(10) Patent No.: US 12,550,875 B1  
(45) Date of Patent: Feb. 17, 2026

(54) TREBLE HOOK PROTECTOR

(71) Applicant: Robby Troutt, Collinsville, TX (US)

(72) Inventor: Robby Troutt, Collinsville, TX (US)

( * ) Notice: Subject to any disclaimer, the term of this patent is extended or adjusted under 35 U.S.C. 154(b) by 0 days.

(21) Appl. No.: 19/060,303

(22) Filed: Feb. 21, 2025

(51) Int. Cl.
  *A01K 83/00* (2006.01)

(52) U.S. Cl.
  CPC .................................. *A01K 83/069* (2022.02)

(58) Field of Classification Search
  CPC ....................................................... A01K 97/06
  USPC .................................................. 43/43.6, 43.2
  See application file for complete search history.

(56) References Cited

U.S. PATENT DOCUMENTS

| | | | | |
|---|---|---|---|---|
| 2,616,209 A | * | 11/1952 | Ploen ...................... | A01K 97/06 43/57.1 |
| 2,841,917 A | * | 7/1958 | Haskell ................... | A01K 97/06 206/315.11 |
| 3,142,931 A | * | 8/1964 | Ulsh ....................... | A01K 97/06 43/57.1 |
| 4,121,368 A | * | 10/1978 | Norwood ................ | A01K 83/00 43/57.1 |
| 4,217,721 A | * | 8/1980 | Hershberger .......... | A01K 83/00 43/43.2 |
| 4,833,814 A | * | 5/1989 | Zygutis ................... | A01K 97/06 43/43.2 |
| 4,869,012 A | * | 9/1989 | Brenholt ................ | A01K 85/02 43/43.2 |
| 5,123,199 A | * | 6/1992 | Lysohir ................... | A01K 97/06 43/57.1 |
| 7,168,202 B2 | * | 1/2007 | Kohler .................... | A01K 97/06 43/57.1 |
| 2010/0180489 A1 | * | 7/2010 | Benesh ................... | A01K 97/06 43/57.1 |
| 2021/0084877 A1 | * | 3/2021 | Ogarrio ................... | A01K 97/06 |

* cited by examiner

*Primary Examiner* — Christopher D Hutchens
(74) *Attorney, Agent, or Firm* — James E. Walton

(57) ABSTRACT

A treble hook protector for securing onto a treble hook. The treble hook protector is comprised of a central body, at least one retention arm extending from the central body, at least one finger hold on the retention arm, and a receiving groove within the central body for receiving the treble hook. The treble hook protector is further comprised of at least one hook well within the retention arm and at least one retention hoop on the underside of the retention arm for supporting the bottom of a barbed prong of the hook.

17 Claims, 5 Drawing Sheets

TREBLE HOOK PROTECTOR

BACKGROUND

1. Field of the Present Description

The present application generally relates to fishing hook protectors, and in particular, to a treble hook protector used to cover the pointed tips of treble hooks.

2. Description of Related Art

One of the many types of hooks used for fishing are treble hooks. Treble hooks have three barbed prongs extending outwardly from the center of the hook such that there are three points for attaching bait and hooking onto a fish. These additional barbed prongs make treble hooks more desirable for fishing because of the versatility of the hook along with the greater potential of hooking a fish from the increased number of barbed prongs. However, this increased number of hooks also increases the chance that the hook could get caught on a passing object or individual causing damage or injury. Hooks are preferably constructed from light weight material and as such, moving the fishing rod or being exposed to wind can also cause the hook to move and potentially contact an individual causing an injury. While fishing rods typically have hook retention hoops along the length of the rod to prevent movement of the hook, these loops only secure one of the hook's barbed prongs to the side of rod and if a treble hook is being used, the other barbed prongs are still exposed and can get caught on someone or something. Even if a hook with a singular barbed prong is secured within the fishing rods hook retention hoops, the pointed tip is still exposed and can cause damage or injury. While protectors or corks may be secured onto the hook to prevent the hook from catching on people and objects, these protectors are limited on how the protectors can be attached to the hook and don't work with every style of treble hook.

Although great strides have been made in the field of fishing hook protectors, improvements can still be made.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
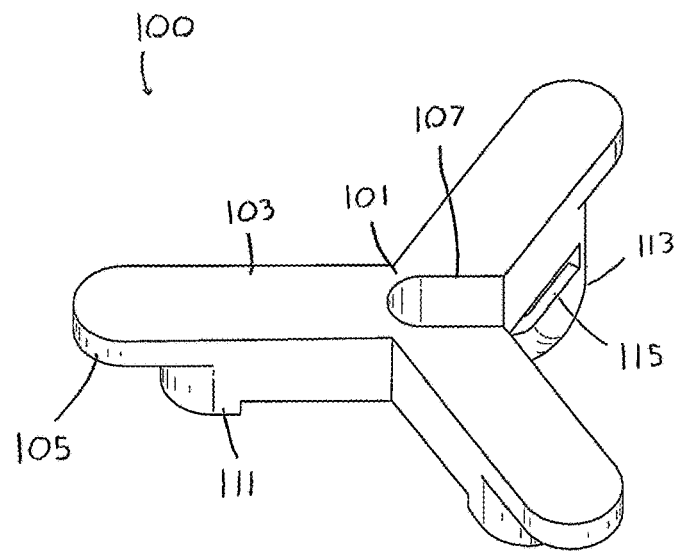
FIG. 1 is a top perspective view of a treble hook protector according to the preferred embodiment of the present application.

While the assembly and method of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the treble hook protector according to the present application are provided below. It will of course be appreciated that in the development of any actual embodiment, numerous implementation-specific decisions will be made to achieve the developer's specific goals, such as compliance with assembly-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. It is also appreciated that the use of "a" or "an" before a noun naming an object is construed to be that the noun refers to both the singular and the plural.

Figure 2:
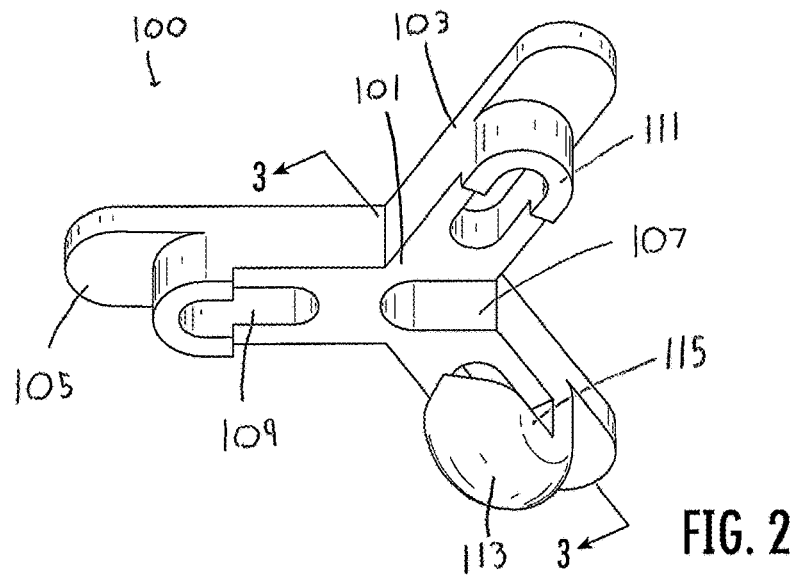
FIG. 2 is a bottom perspective view of the treble hook protector from FIG. 1.

Referring now to FIGS. 1-2 in the drawings, perspective views of treble hook protector 100 according to the preferred embodiment of the present application are displayed. As shown in the drawings, treble hook protector 100 is comprised of central body 101, retention arms 103, finger holds 105, receiving groove 107, hook wells 109, retention walls 111, retention hoop 113, and hoop side walls 115. Treble hook protector 100 is generally Y-shaped with three retention arms 103 extending outwardly from central body 101 with the top of body 101 and arms 103 being planar. In the preferred embodiment, treble hook protector 100 is comprised of marine-grade plastic, brass, bronze, stainless steel, aluminum, or any other material that is UV-resistant and corrosion resistant. Treble hook protectors 100 are designed to be used with fishing hooks and as such, protectors 100 are exposed to significant amounts of UV rays and water which would cause non-resistant materials to deteriorate and expose the barbed prongs of the treble hook.

In the preferred embodiment, each retention arm 103 preferably extends the same length from central body 101 to match the size of a treble hook. However, alternative embodiments may also exist where retention arms 103 may extend further from central body 101 or not as far from body 101 to accommodate different sized treble hooks. Alternative embodiments may also exist where retention arms 103 are not all the same length with some arms 103 being longer or shorter than others to accommodate uniquely shaped hooks. Along with extending equal lengths from central body 101, retention arms 103 are preferably equally spaced around central body 101 to match the position of the treble hook's barbed prongs. However, alternative embodiments may also exist where arms 103 are not equally space around central body 101 to match the shape of other hook configurations. Alternative embodiments may also exist where there are more than three or less than three retention arms 103 extending outwardly from central body 101 to receive hooks with various amounts of barbed prongs.

Referring now in particular to FIG. 2 in the drawings, the underside of treble hook protector 100 is depicted. As shown in the drawings, the end of each retention arm 103 has the bottom portion partially removed to create finger holds 105. Finger holds 105 provide a location for an individual's fingers to press against and easily maneuver treble hook protector 100 when protector 100 is being secured onto or removed from a treble hook. When maneuvering the treble hook, there is a chance that the individual's fingers may slip along the length of the hook and be injured by the barbed prongs. Treble hooks may be especially slick after being used for fishing as water will make it more difficult to firmly grip the hook. Finger holds 105 positioned at the ends of retention arms 101 allows an individual to easily grip and maneuver treble hook protector 100 while holding the top of the treble hook instead of having to maneuver the potentially slick treble hook into protector 100. While finger holds 105 are shown to be positioned at the ends of retention arms 103 in the present application, alternative embodiments may also exist where fingers holds 105 may be positioned at any point along the length of arms 103. It is also appreciated that while finger holds 105 are shown with a smooth surface in FIG. 2, alternative embodiments may also exist where finger holds 105 have raised textures or bumps along the bottom surface of holds 105 making it easier for an individual to grip onto holds 105. Alternative embodiments may also exist where textured materials or paints may be applied to the bottom surface of finger holds 105 increasing the friction at holds 105 to make it easier for an individual to grip holds 105 when maneuvering treble hook protector 100.

When securing a treble hook within treble hook protector 100, the top of the treble hook is initially inserted into receiving groove 107 before the tips of the barbed prongs are secured within protector 100. Receiving groove 107 is preferably positioned between any two retention arms 103 and extends inwardly within central body 101. As shown in FIG. 2, receiving groove 107 has a width slightly smaller than the width of retention arms 103 and has a curved end wall within central body 101 to facilitate maneuvering treble hook protector 100 around the hook when in groove 107. The wider width of receiving groove 107 allows individuals to twist and rotate treble hook protector 100 around the treble hook until the tip of each barbed prong is secured within protector 100. While alternative embodiments may also exist where receiving groove 107 is narrower than shown in the present application, the broader width of receiving groove 107 as shown in the drawings is preferred to facilitate manipulation of treble hook protector 100 around the treble hook.

Figure 3:
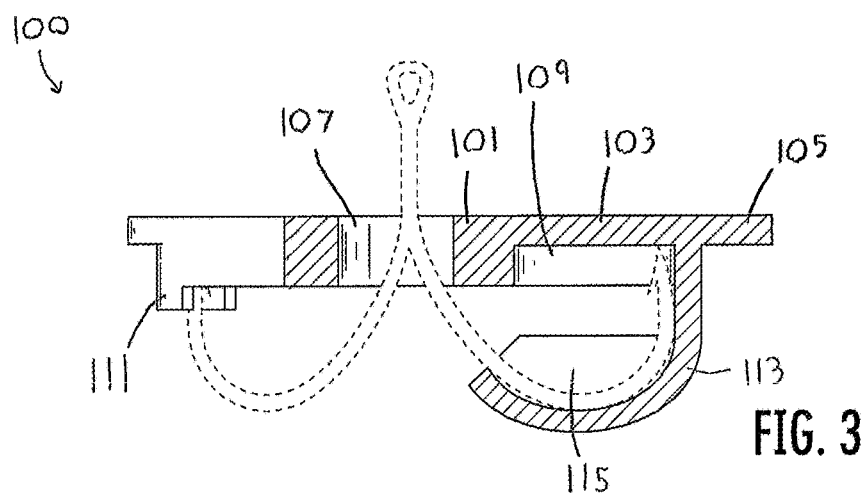
FIG. 3 is a cross-section view of the treble hook protector from FIG. 2 with a hook secured within.

In the preferred embodiment, each retention arm 103 has a hook well 109 disposed through the bottom surface of arms 103 for receiving the barbed prongs of the treble hook. Hook wells 109 are designed to freely receive the barbed prongs of treble hook without engaging the barbed tips. By not engaging the tips of the barbed prongs within hook wells 109, the barbed prongs can be easily moved within hook wells 109 as needed for attachment or removal of treble hook protector 100 onto the treble hook. However, alternative embodiments may also exist where hook wells 109 may contain spongey material or an internal ledge for engaging with the tips of the barbed prongs to secure the barbed prongs in place within wells 109. Hook wells 109 are generally oval-shaped slots and, as seen in FIG. 3, are disposed half-way through retention arms 103 such that only the tips of the barbed prongs are covered when secured within wells 109 leaving the rest of the hook uncovered. Hook wells 109 preferably extend partially along the length of retention arms 103 and are capable of receiving various sized treble hooks without having to use treble hook protectors 100 with longer or shorter retention arms 103. While an oval-shaped hook well 109 is shown in the present application, it is appreciated that alternative embodiments may also exist where hook wells 109 are rectangular, circular, or any other shape, so long as there is enough space within wells 109 for maneuvering the treble hooks along the length of retention arms 103. Alternative embodiments may also exist where instead of hook wells 109 being singular slots as shown in the present application, hook wells 109 may instead be a series of slots or apertures to receive various sized treble hooks. It is also appreciated that alternative embodiments may also exist where the depth of hook wells 109 is either greater or lesser than shown to better receive different sized treble hooks.

Once the barbed prongs of the treble hook have been positioned within hook wells 109, retention walls 111 along the perimeter of wells 109 prevent the treble hook from being unintentionally removed. As seen in FIG. 2, retention walls 111 are positioned along the perimeter of hook wells 109 and extend outwardly from the bottom of retention arms 103. Retention walls 111 are preferably comprised of two parallel walls along the straight length of hook wells 109 and a curved wall along the far end of wells 109 connecting the two parallel walls together to form a C-channel. While two parallel walls connected by a curved wall are shown in the present application, alternative embodiments may also exist where retention walls 111 are instead formed from two parallel walls not connected by a curved wall. In the preferred embodiment, retention walls 111 begin at the end of hook wells 109 near finger holds 105 and extend partially along the length of wells 109 towards central body 101 before ending. When securing the treble hook's barbed prongs within hook wells 109, treble hook protector 100 is maneuvered around the treble hook until the barbed prongs are slid into the end of wells 109 near central body 101. Once the tips of the barbed prongs are positioned within hook wells 109, treble hook protector 100 is maneuvered around the treble hook to position the barbed prongs between retention walls 111 to prevent the tips of the barbed prongs from being twisted out of wells 109. In the preferred embodiment, retention walls 111 are disposed on two of the three retention arms 103 with the last retention arm 103 having retention hoop 113. However, alternative embodiments may also exist where only one retention arm 103 may have retention walls 111 with the other two arms 103 having retention hoops 113 or where every arm 103 has a retention hoop 113.

As shown in FIG. 2 of the drawings, retention hoop 113 is preferably designed to be hook shaped with a back wall protruding down from retention arm 103 and curving forward to match the shape of the bottom of a hook's barbed prong. When securing the treble hook within treble hook protector 100, the tip of each barbed prong is maneuvered into hook wells 109 with the bottom of at least one of the barbed prongs being further supported by retention hoop 113. As shown in the drawings, similar to retention walls 111, retention hoop 113 is positioned at the far edge of a hook well 109, such that hoop 113 receives the underside of the barbed prong when positioned within well 109. Retention hoop 113 supports the underside of the barbed prong preventing the treble hook from being pulled down and away from treble hook protector 100 exposing the tip of the barbed prong. While the current embodiment shows retention hoop 113 being a solid section of material, alternative embodiments may also exist where apertures are disposed through hoop 113 to allow for water on the treble hook to drain out of hoop 113 so that the water is not retained within hoop 113 potentially damaging the hook. The other prongs of treble hook not secured within retention hoop 113 do not have the underside of the prong supported and as such, the water on these prongs can freely drain off the hook. Once the barbed prong of the treble hook is secured within retention hoop 113, hoop side walls 115 prevent the barbed prong from being unintentionally twisted out of hoop 113. Hoop side walls 115 function similarly to retention walls 111 and extend slightly upwards from the bottom of retention hoop 113 to keep the barbed prong secured within hoop 113.

Referring now also to FIG. 3 of the drawings, a cross-section view of treble hook protector 100 taken at cross section 3-3 in FIG. 2 is depicted. As shown, when a treble hook is secured within treble hook protector 100, the bottom of one of the hook's barbed prongs is supported within retention hoop 113 preventing the hook from being pulled down. While retention hoop 113 secures the treble hook vertically, retention walls 111 and hoop side walls 115 prevent the barbed tips of the treble hook from being unintentionally twisted to the side out of hook wells 109 and removed from treble hook protector 100. When an individual wants to remove the treble hook from treble hook protector 100, finger holds 105 provide a location for manipulating protector 100 around the top of the hook to shift each prong within hook wells 109. Shifting the prongs within hook wells 109 towards central body 101 moves the prongs away from retention walls 111 and hoop side walls 115 allowing the treble hook to be twisted free of protector 100 so that the hook can be used in fishing.

Figure 4:
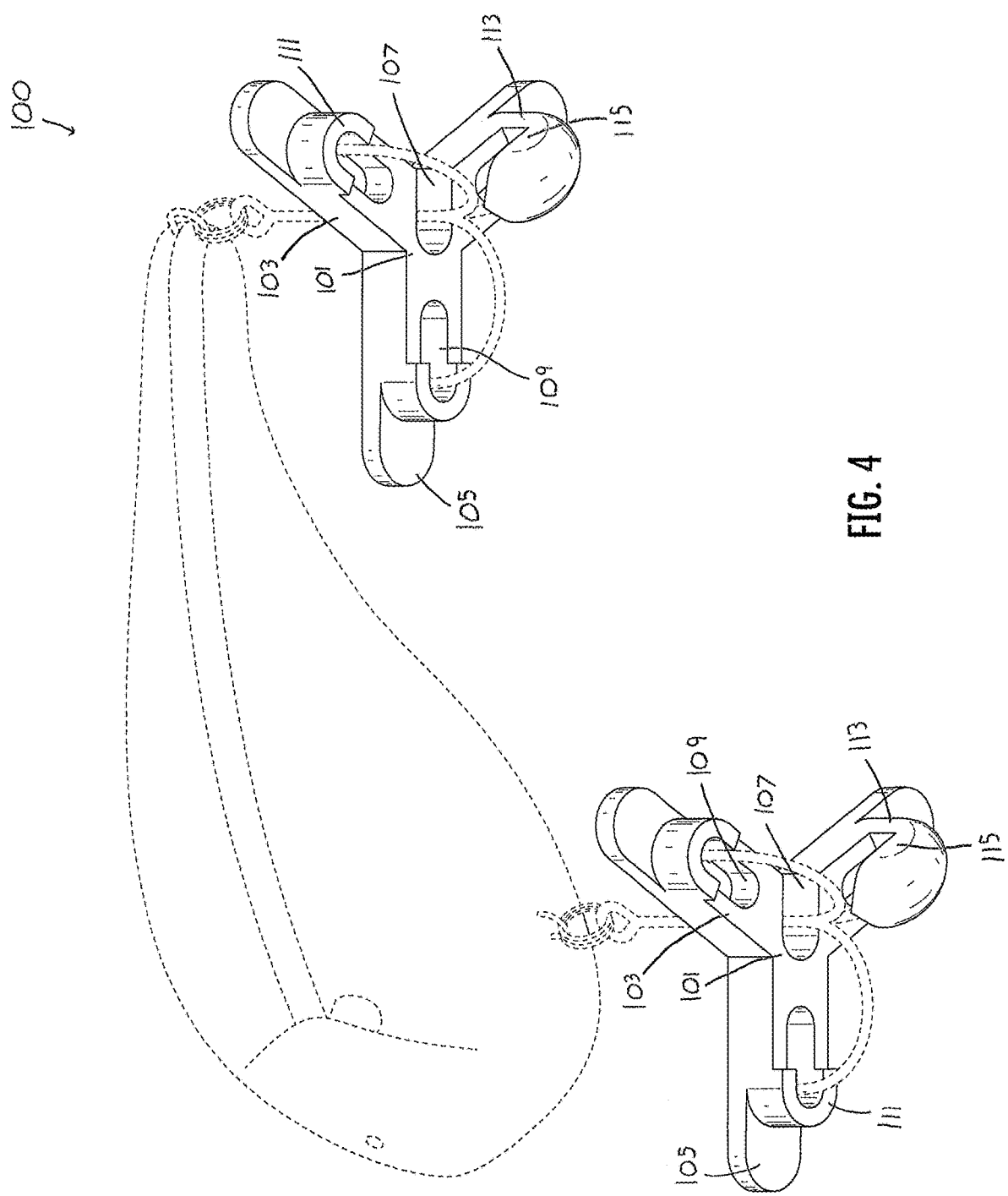
FIG. 4 is a bottom perspective view of two treble hook protectors from FIG. 1 secured onto a fishing lure with two treble hooks.
Figure 5:
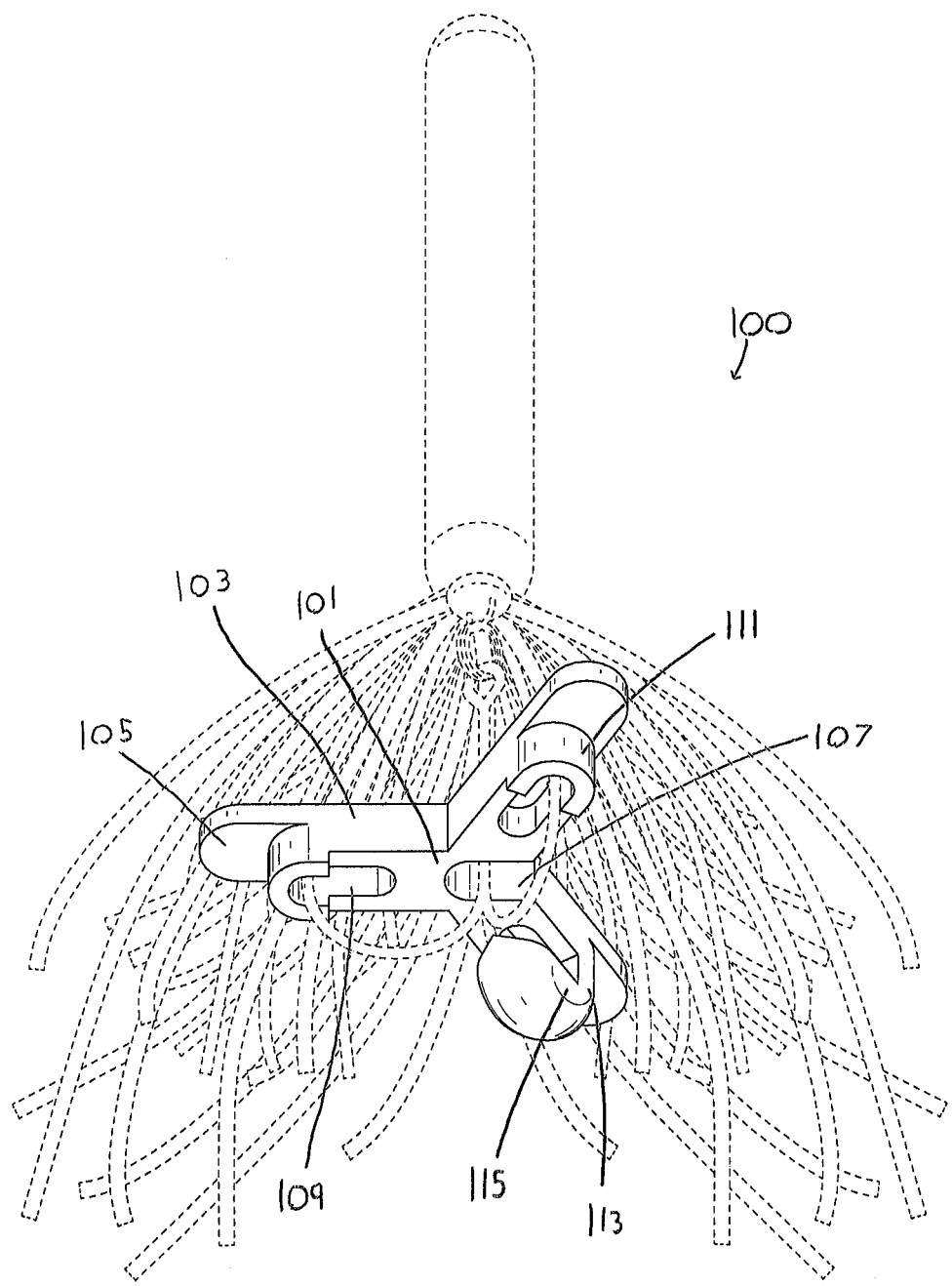
FIG. 5 is a bottom perspective view of the treble hook protector from FIG. 1 secured onto a fishing lure having a skirt.
Figure 6:
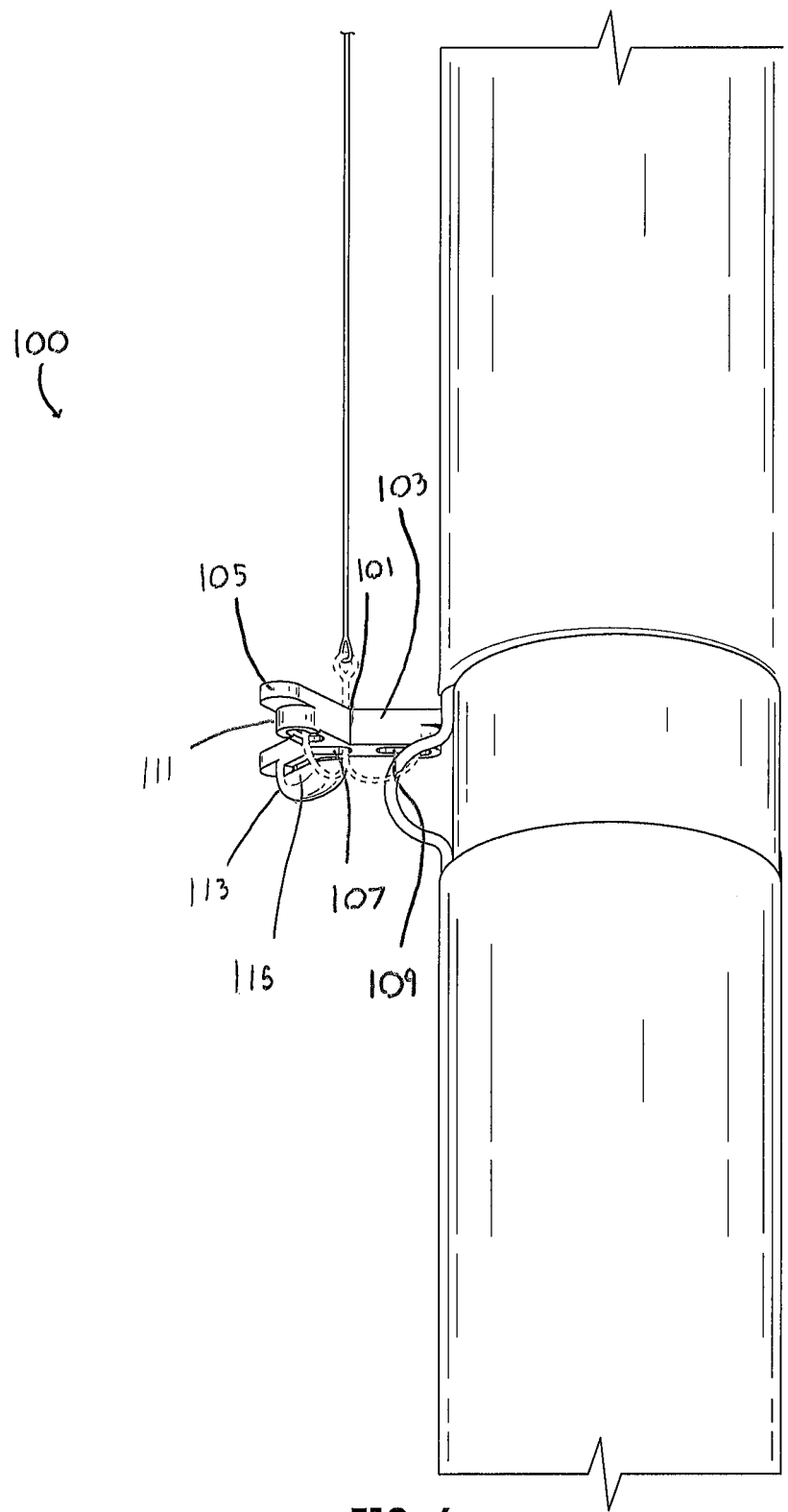
FIG. 6 is side perspective view of the treble hook protector from FIG. 1 secured onto a hook that is connected to a hook retention loop of a fishing pole.

Referring now also to FIGS. 4-6 in the drawings, perspective views of treble hook protector 100 attached to various treble hooks are depicted. As seen in FIG. 4, fishing lures may contain more than one treble hook and the size of treble hook protector 100 allows for easy attachment of more than one protector 100 to those lures containing multiple hooks. Referring now in particular to FIG. 5 in the drawings, a treble hook protector 100 is shown attached to a lure containing multiple frills extending from the top of the lure. Lures often contain frills, feathers, or other delicate additions designed to attract the attention of fish which could be damaged if mishandled. By attaching treble hook protector 100 to the top of the hook and leaving most of the hook uncovered as shown in FIG. 5, protector 100 does not engage with the delicate features of the lure allowing protector 100 to be used on this style of lure without damaging the other components. Referring now in particular to FIG. 6 in the drawings, it is shown that treble hook protector 100 may also be secured to a treble hook when the hook is already connected to a hook retention loop of a fishing pole. Hook retention loops are typically positioned along the length of fishing poles and are designed to receive fishing hooks when the pole is not being used so that the hook does not move around unintentionally. When a hook is secured within the hook retention loop, the bottom of one of the barbed prongs is hooked within the loop preventing movement, however, this does not cover the tips of the barbed prongs which are still exposed and capable of injuring individuals or catching onto passing structures. As it is the bottom of the hook securing the treble hook to the retention loop, treble hook protector 100 can still be attached to the top of the treble hook covering the tips of the barbed prongs so long as retention hoop 113 is used with a barbed prong not connected to the hook retention loop on the fishing pole.

Figure 7:
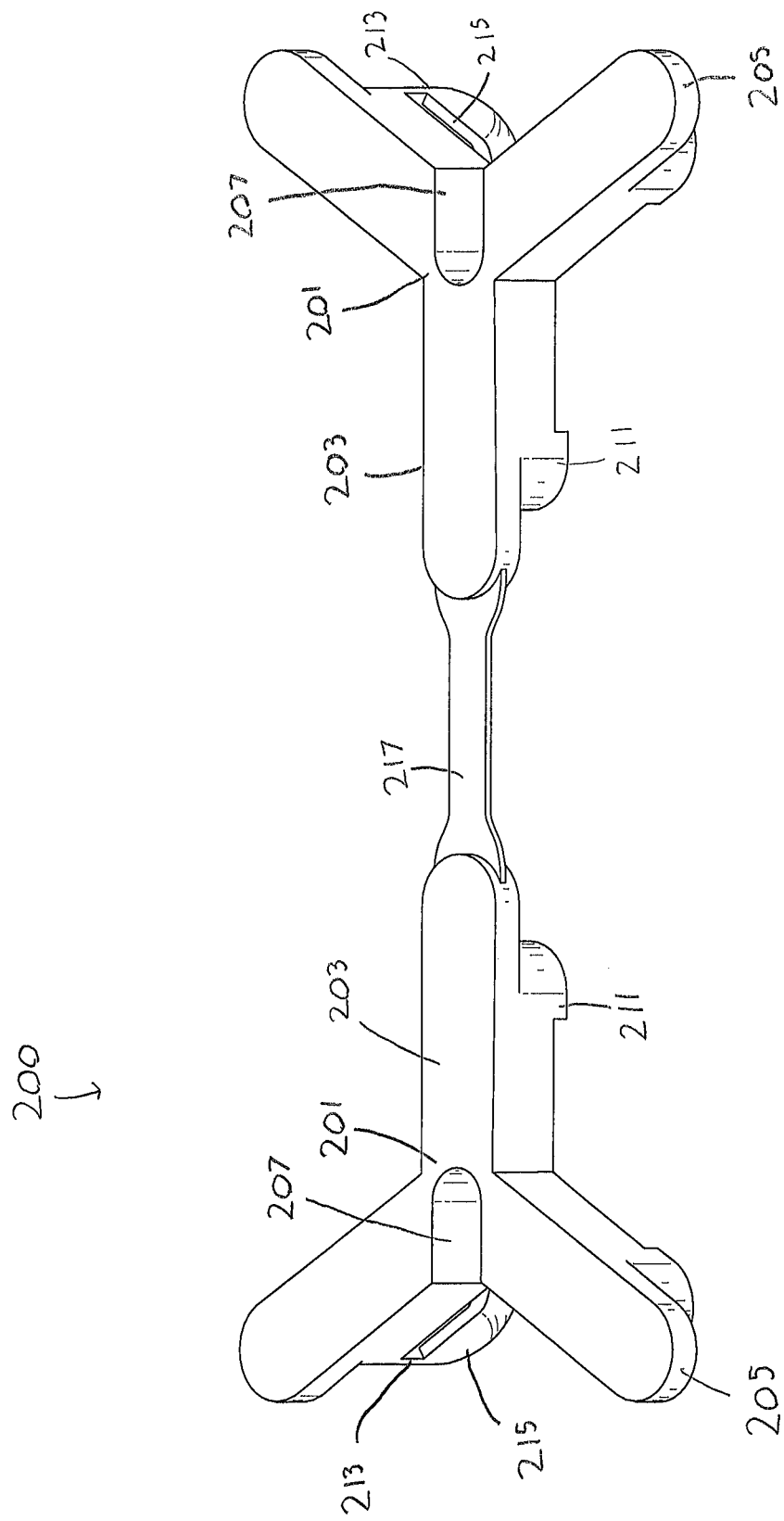
FIG. 7 is a top perspective view of a treble hook protector according to an alternative embodiment of the present application.

Referring now also to FIG. 7 in the drawings, treble hook protector 200 according to an alternative embodiment of the present application is depicted. Like with treble hook protector 100, treble hook protector 200 is comprised of central body 201, retention arms 203, finger holds 205, receiving groove 207, hook wells 209, retention walls 211, retention hoop 213, and hoop side walls 215 which all have the same functionality as the components in protector 100. Along with the above-mentioned components, treble hook protector 200 is further comprised of connector 217 extending outwardly from retention arm 203 of one protector 200 to retention arm 203 of another protector 200. When more than one treble hook is attached to a lure, as shown in FIG. 4, there is a chance that the hooks could get tangled together if the distance between the two hooks is not properly maintained. Connector 217 functions as a spacer for two treble hooks by keeping treble hook protectors 200 a designated distance apart to prevent the treble hooks from getting tangled together. It is also appreciated that while receiving grooves 207 on treble hook protectors 200 are shown on opposing ends of protectors 200, alternative embodiments may also exist where receiving grooves 207 may be positioned between any retention arms 203 and not just opposite the retention arm 203 attached to connector 217.

It is apparent that a system and method with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

The invention claimed is:

1. A treble hook protector for attachment to a hook, the treble hook protector comprising:
   a central body;
   at least one retention arm extending outwardly from the central body;
   at least one finger hold disposed on the at least one retention arm;
   a receiving groove disposed through the central body, the receiving groove being configured to receive a top of the hook;
   at least one hook well disposed within an underside of the at least one retention arm, the at least one hook well being configured to receive a barbed prong of the hook; and
   at least one retention hoop disposed on the underside of the at least one retention arm, the at least one retention hoop being configured to support a bottom of the barbed prong;
   wherein the hook is only partially enclosed within the treble hook protector, such that air can flow against, and assist in drying, the hook when retained within the treble hook protector.

2. The treble hook protector of claim 1, wherein only a tip of the barbed prong is positioned within the at least one hook well.

3. The treble hook protector of claim 1, further comprising:
at least one hoop side wall extending up from the at least one retention hoop, the at least one hoop side wall being configured to prevent the barbed prong from being unintentionally removed from the at least one retention hoop.

4. The treble hook protector of claim 1, further comprising:
at least one aperture disposed through the at least one retention hoop, the at least one aperture being configured to drain water from within the at least one retention hoop.

5. The treble hook protector of claim 1, further comprising:
at least one additional retention arm extending outwardly from the central body; and
at least one hook well disposed within an underside of the at least one additional retention arm, the at least one hook well being configured to receive a barbed prong of the hook.

6. The treble hook protector of claim 5, further comprising:
at least one retention wall partially disposed along the at least one hook well, the at least one retention wall extending down from the at least one additional retention arm to prevent the barbed prong from being unintentionally removed from the at least one hook well.

7. The treble hook protector of claim 6, wherein the at least one retention wall comprises:
a pair of parallel walls extending along a straight length of the at least one hook well.

8. The treble hook protector of claim 7, wherein the at least one retention wall further comprises:
at least one curved wall extending along a curved length of the at least one hook well, the at least one curved wall being configured to connect the pair of parallel walls.

9. The treble hook protector of claim 1, wherein the treble hook is formed from UV resistant material.

10. The treble hook protector of claim 1, wherein the treble hook is formed from corrosion resistant material.

11. A treble hook protector for securing a hook, comprising:
a central body;
at least one retention arm extending outwardly from the central body;
at least one finger hold disposed on the at least one retention arm;
a receiving groove disposed through the central body, the receiving groove being configured to receive a top of the hook;
at least one hook well disposed within an underside of the at least one retention arm, the at least one hook well being configured to receive a barbed prong of the hook;
at least one retention hoop disposed on the underside of the at least one retention arm, the at least one retention hoop being configured to support a bottom of the barbed prong; and
at least one connector extending outwardly from the at least one retention arm, the at least one connector being configured to connect the treble hook protector to an additional treble hook protector.

12. The treble hook protector of claim 11, further comprising:
at least one hoop side wall extending up from the at least one retention hoop, the at least one hoop side wall being configured to prevent the barbed prong from being unintentionally removed from the at least one retention hoop.

13. The treble hook protector of claim 11, further comprising:
at least one aperture disposed through the at least one retention hoop, the at least one aperture being configured to drain water from within the at least one retention hoop.

14. The treble hook protector of claim 11, further comprising:
at least one additional retention arm extending outwardly from the central body; and
at least one hook well disposed within an underside of the at least one additional retention arm, the at least one hook well being configured to receive a barbed prong of the hook.

15. The treble hook protector of claim 14, further comprising:
at least one retention wall partially disposed along the at least one hook well, the at least one retention wall extending down from the at least one additional retention arm to prevent the barbed prong from being unintentionally removed from the at least one hook well.

16. The treble hook protector of claim 15, wherein the at least one retention wall comprises:
a pair of parallel walls extending along a straight length of the at least one hook well.

17. The treble hook protector of claim 16, wherein the at least one retention wall further comprises:
at least one curved wall extending along a curved length of the at least one hook well, the at least one curved wall being configured to connect the pair of parallel walls.

* * * * *